United States Patent [19]

Hasegawa

[11] 4,145,580
[45] Mar. 20, 1979

[54] MULTI-FREQUENCY SIGNAL RECEIVER
[75] Inventor: Kouichi Hasegawa, Tokyo, Japan
[73] Assignee: Nippon Electric Co., Ltd., Tokyo, Japan
[21] Appl. No.: 871,711
[22] Filed: Jan. 23, 1978
[30] Foreign Application Priority Data
Jan. 24, 1977 [JP] Japan .................................. 52-6546
[51] Int. Cl.² ............................................ H04Q 1/46
[52] U.S. Cl. ............................................... 179/84 VF
[58] Field of Search ................................... 179/84 VF
[56] References Cited
U.S. PATENT DOCUMENTS
3,961,143  6/1976  Thyssens ........................ 179/84 VF Primary Examiner—William C. Cooper
Attorney, Agent, or Firm—Sughrue, Rothwell, Mion, Zinn and Macpeak

[57] ABSTRACT

A multi-frequency signal receiver for use in tone signalling circuits is disclosed. The receiver includes a plurality of channel band pass filters having mutually independent pass bands, each of which receives the input signal. Threshold detectors are connected to the outputs of the channel bandpass filters as is a variable threshold circuit. The variable threshold circuit includes a peak hold circuit and an attenuator for generating a threshold value for the detectors. A rectifier and integrator circuit rectifies an output which is weighted compared with the output of the peak hold circuit to produce a timing signal. The timing signal is used to gate the output of the detectors.

5 Claims, 5 Drawing Figures

MULTI-FREQUENCY SIGNAL RECEIVER

BACKGROUND OF THE INVENTION

1. Field of the Invention

The present invention relates to a multi-frequency signal receiver for frequency-analyzing a plurality of tone frequencies, whose presence or absence designates in combination the number called.

2. Description of the Prior Art

Multi-frequency (MF) pulsing is a form of voice-frequency alternating current signalling used to transmit digital information over telephone circuits. These signals are used to select appropriate switch paths in local, toll and tandem dial systems and thus set up telephone connections. The MF signalling system employ six frequencies in the range of 700 to 1700 Hz selected at an interval of 200 Hz to designate the decimal digits 0, 1, 2, ... 9, the start of pulsing signal (KP) and the end of pulsing signal (ST). These signals are represented by combinations of two of these six frequencies. Since a code is always composed of two frequencies, it is possible at the receiver end to check whether a received signal is correct or erroneous (2-out-of-6 check). Therefore, the basic function required for an MF receiver is to reliably detect the presence of these frequency components.

Conventional circuit systems for such an MF receiver include those of a linear amplifier (LA) type, automatic gain control (AGG) type, and variable threshold value (VTH) type. With the LA type system, noise is removed by a main bandpass filter MBPF first to allow the frequency components to be discriminated by channel band-pass filters (CHBPF) and detected with respect to a fixed threshold value. The CHBPF are required to have high attenuation to prevent malfunctions caused by the relatively narrow frequency spacing of 200 Hz.

The AGC type system is such that the dynamic range of the MF signal is compressed by an AGC circuit to allow the attenuation ratio of the CHBPF to be reduced. There still remain problems, however, with respect to non-linearity and the response time of the AGC element. In the VTH type system, the output of the MBPF is subjected to peak-holding by a variable threshold circuit VTH, whose threshold value for a signal detector circuit (DET) depends on the level difference between two frequencies. In this system, since the dynamic range is perfectly compressed in appearance, the attenuation ratio and the number of the filtering stages of the CHBPF can be reduced.

One of the examples of the VTH type is proposed in British Pat. No. 1,342,904 granted to PLESSEY TELECOMMUNICATIONS RESEARCH LIMITED (corresponding to Canadian Pat. No. 941,026). In this multi-frequency data receiver, if a composite signal is received, output signals are delivered by voice frequency detection stages (VFD's) when the corresponding frequencies are present. The outputs of the voice frequency detection stages VFD's are connected to corresponding gate circuits WG1 to WG6, respectively, which are called "window" gates. The outputs of the voice frequency detection stages VFD's are also connected to a reference level generator (RLG) through an OR gate composed of six diodes D1 to D6. The output of the RLG is used to supply a reference voltage VR to all the "window" gates WG1 to WG6.

The reference voltage VR is generated on the basis of the highest voltage level among the received frequency components by attenuating the highest level by a predetermined factor. The window gate delivers a logic level "1" when the output level from the VFD exceeds the reference voltage VR, while it delivers a logic level "0" when the output level does not exceed the reference voltage VR. The logical product between the outputs of these gates WG1 to WG6 and a common valid signal VS generated by a summation and valid signal logic S & VSL are derived by AND gates G01 and G06 and are delivered on output lines CLA to CLF.

In this multi-frequency data receiver, the voice frequency detection stage VFD is made to have a rectifier function in addition to the band-pass filter function. Also, generation of a timing signal depends upon the summation and valid signal logic S & VSL connected to the outputs of the gate circuits WG.

In addition, U.S. Pat. No. 3,555,435 issued to Vosteen discloses a multi-frequency signal receiver, in which channel band-pass filters coupled to detector circuits are connected to an amplifier regulating circuit by way of diodes. This system is a PB receiver in which the common AGC circuit and the VTH circuit are mixed.

SUMMARY OF THE INVENTION

It is one object of the present invention to provide a multifrequency signal receiver which can be constructed of a simple circuit arrangement that is different from the heretofore known multi-frequency signal receivers.

Another object of the present invention is to provide a multifrequency signal receiver which can absorb a transient response of channel band-pass filters by inhibitting its output for a predetermined period of time after the application of the incoming signal.

Still another object of the present invention is to provide a highly reliable multi-frequency signal receiver in which malfunctions will not occur when a noise outside of a given band is applied to its input.

According to the present invention, there is provided a multifrequency signal receiver adapted to receive a signal consisting of at least two frequency tones selected out of more-than-two predtermined frequencies, comprising a filter means having mutually independent pass bands at said frequencies, a detector means coupled with said filter means for sensing the presence of signal output at each of said frequencies, a variable threshold circuit for detecting the maximum value among the output signals of said filter means and for generating a threshold value for said detector means, an integrator circuit for integrating the input of said filter means, means for effecting weighted comparison between the outputs of said variable threshold circuit and said integrator circuit to provide a timing pulse, and means for gating outputs of said detector means by the timing pulse.

DESCRIPTION OF THE PREFERRED EMBODIMENT

Figure 1:
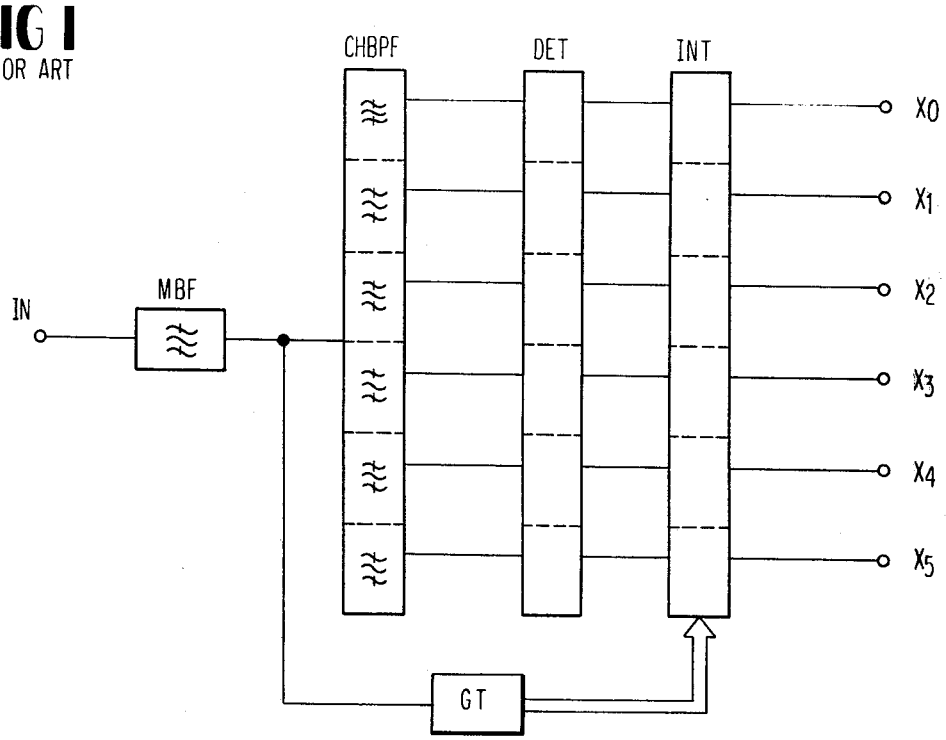
FIG. 1 is a block diagram of one example of the multi-frequency receiver apparatus in the prior art.

Referring now to FIG. 1 which shows one example of the prior art MF signal receiver circuits, when a signal wave consisting of a plurality of different frequency groups has reached an input terminal IN, the frequency group of the signal wave is applied to an input of a main band-pass filter MBF. The main band-pass filter MBF separates a signal group to be selected from signals outside of its frequency band which have mixed with the input signal by means of its band-pass frequency characteristics. The output of the main band-pass filter MBF is connected in common to a plurality of channel band-pass filter CHBPF provided for respective frequency bands. Each channel band-pass filter CHBPF is composed of a band-pass filter having an individual frequency band, and serves to detect a wave at a frequency within a selected band among the group of frequencies in the input signal and to output only the frequency component.

The above-mentioned respective outputs are connected to inputs of detectors DET having a fixed threshold value and provided in correspondence to the respective frequency bands to be compared with the fixed threshold value, and the result is converted into a bi-level pulse signal and then outputted.

On the other hand, the output of the above-described main band-pass filter MBF is connected also to an input of a gate timer circuit GT so as to control the timing system of the receiver. The gate timer GT is constructed in such manner that a predetermined delay time after the output of the aforementioned main band-pass filter MBF has exceeded the preset threshold value, a plurality of pulse trains may be generated.

Since the outputs of the detectors DET indicate either the presence or the absence of the outputs after the input signal has been separated into the respective frequency bands, if this information is stored in an information storage device after a predetermined period of time by means of the output pulse derived from the aforementioned gate timer GT, then it is possible to convert a plurality of input signals consisting of different frequencies into D.C. output signals and to deliver them at terminals X0 to X5.

In a multi-frequency signal receiver having the above-described construction, the output level range of the above-described channel band-pass filter CHBPF is broad if the response level range of the input consisting of different frequencies is broad. It is therefore necessitated to select the threshold value of the detector DET lower than the lowest response level. In addition, since the channel band-pass filter CHBPF is not an ideal band-pass filter, waves in the adjacent bands may possibly leak into the output of the channel band-pass filter causing cross-talk noise. As a result, the cross-talk noise level exceeds in some cases the threshold value of the detector DET when an adjacent frequency at a high input level has reached the receiver. This imposes a condition that is contradictory to the aforementioned lowering of the threshold value. To resolve this problem, in general the number of stages of the aforementioned channel band-pass filter CHBPF is increased in order to make its Q-value higher. For example, in a multifrequency receiver that is currently used in a telephone exchange, six-stage band-pass filters are employed and the Q-value for each two-stage section is about 30 at the maximum.

Because of the need for complicated, high-performance CHBPF's, the conventional multi-frequency signal receivers are costly to manufacture. Furthermore, the CHBPF's are not easy to make in the form of a hybrid integrated circuit. In addition, in case where the frequencies of the signal and the out-of-band noise are close to each other, the number of stages of the main band-pass filter MBF becomes large, and so, the filters are complicated and costly to manufacture.

Figure 2:
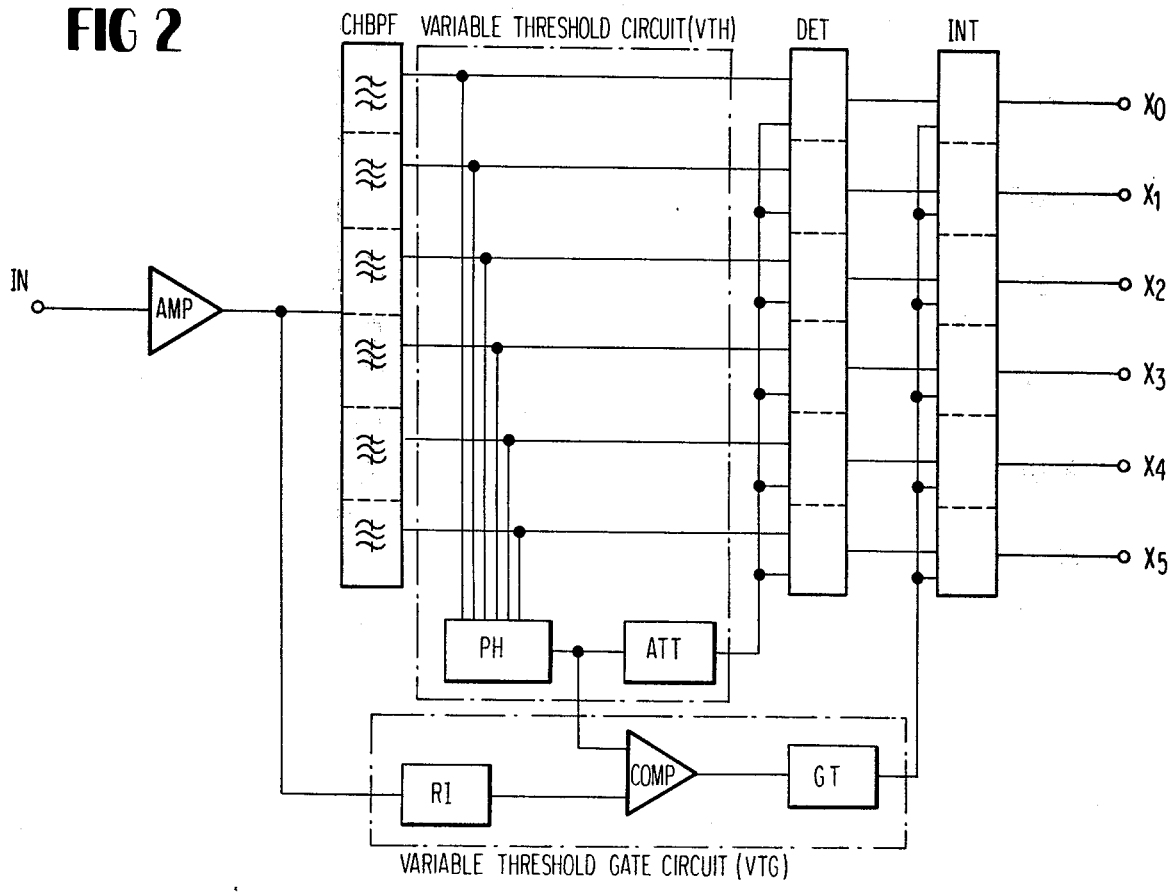
FIG. 2 is a block diagram of one preferred embodiment of the present invention.

Referring now to FIG. 2, an amplifier AMP is provided in place of the main band-pass filter MBF shown in FIG. 1. Also, connections are made from the outputs of the CHBPF's not only to the inputs of the respective detectors DET but also to respective inputs of a peak-holding circuit PH in a variable threshold circuit VTH. The peak-holding circuit PH is constructed so as to rectify a linear A.C. signal and to output the maximum rectified value. The output of the peak-holding circuit PH is connected to an attenuator ATT and a comparator circuit COMP in a variable threshold gate circuit VTG. A threshold voltage generated by the variable threshold circuit VTH is fed to the respective detectors DET as a common threshold value. In addition, an output signal of the amplifier AMP which has passed a rectifier-integrater circuit RI, is compared with an output signal of the peak hold circuit PH by the comparator circuit COMP. Furthermore, the output of the comparator COMP serves as an input to a gate timer circuit GT. The output of the gate timer circuit GT and the outputs of the ditectors DET are connected to an interface circuit INT which is arranged to produce logic '1' output to output terminals $X_0$, $X_1$, . . . ., $X_5$. Each section of the interface circuit may be made of an AND circuit.

Figure 3:
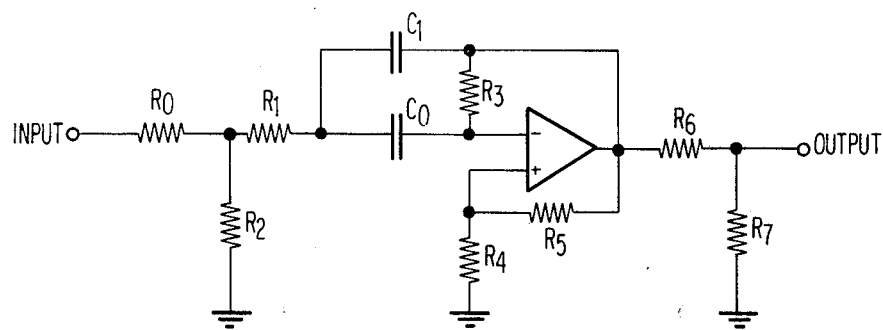
FIG. 3 is a basic circuit diagram of a channel bandpass filter shown in FIG. 1.

Referring to FIG. 3, the channel band-pass filter CHBPF employs, as a basic circuit, a second order negative feedback type band-pass filter that is stable even at a high Q-value. A greater frequency selectability is achieved by combining two of such circuits in cascade. After the center frequency of each basic circuit has been adjusted with a resistor $R_3$ and the Q-value has been adjusted with resistors $R_4$ and $R_5$, the respective basic circuits are cascaded in two stages. The gain of the channel band-pass filter is then adjusted with resistors $R_6$ and $R_7$. These resistors $R_6$ and $R_7$ are provided only in the last stage of the basic circuit.

Figure 4:
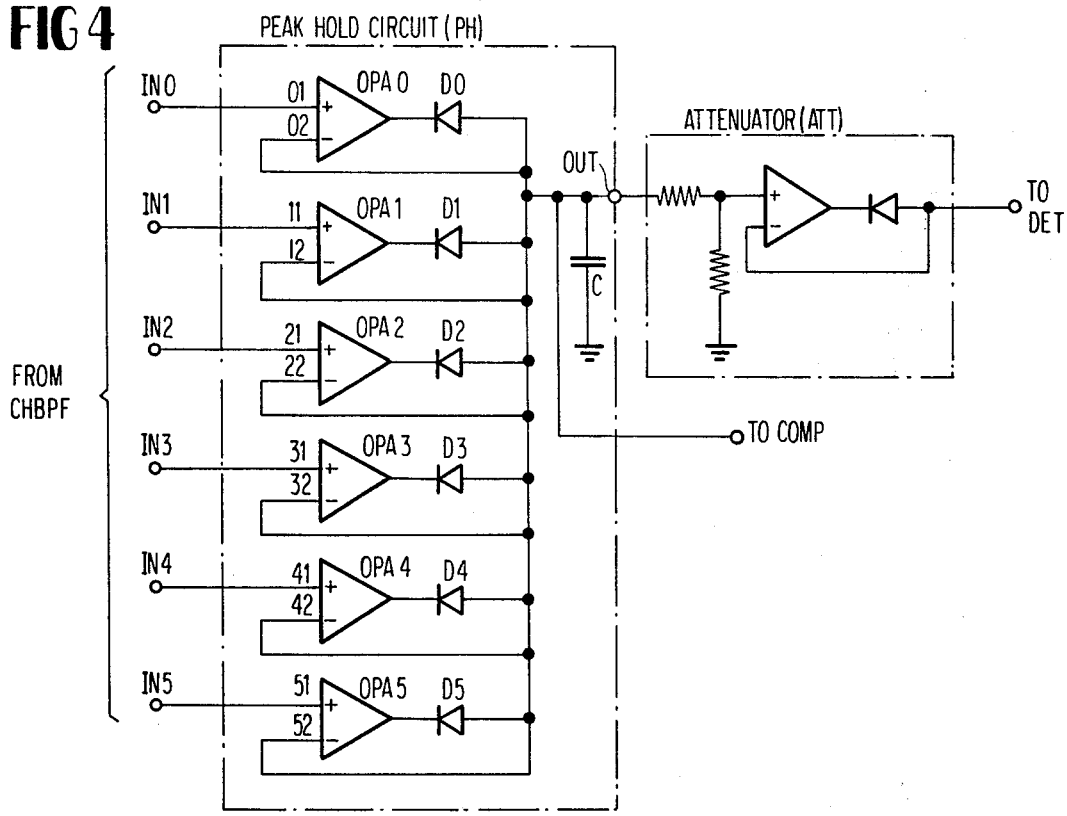
FIG. 4 is a schematic circuit diagram of a variable threshold circuit shown in FIG. 1.
Figure 5:
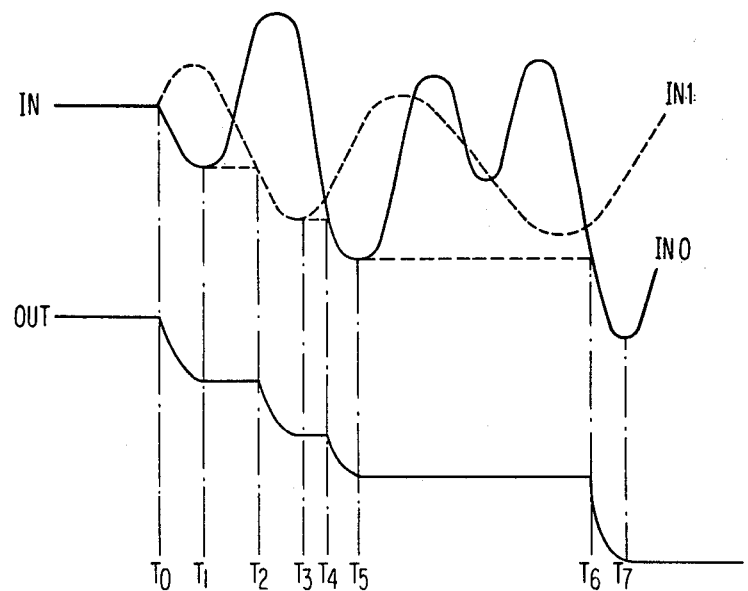
FIG. 5 is a diagram showing input-output characteristics of a peak hold circuit (PH) shown in FIG. 4.

Referring to FIGS. 4 and 5, the variable threshold circuit VTH is composed of a peak-holding circuit PH and an attenuator ATT. The peak-holding circuit PH comprises differential input operational amplifiers OPA0 ~ OPA5, and the respective operational amplifiers have their first input terminals (positive input terminals) 01, 11, 21, 31, 41 and 51 connected as input terminals for the outputs of the channel band-pass filters CHBPF, and have diodes D0 to D5, respectively, connected between their second input terminals (negative input terminals) 02, 12, 22, 32, 42 and 52 and the respective output terminals of the operational amplifiers OPA, and the second input terminals are connected in common.

Assuming now that all the multi-frequency tones are at a zero level, then the signal at the output terminal takes a zero level. It is also assumed in FIGS. 4 and 5 that an input signal represented by a solid line is applied to an input terminal IN0, while another input signal represented by a broken line is applied to another input terminal IN1, with the remaining input terminals kept at a zero level. The input-output characteristics illustrated in FIG. 5 show the state where simultaneously with detection of the negative maximum value in the peak hold circuit PH, a capacitor C connected as a load holds the negative peak value.

During the period between time points $T_0$ and $T_1$, the level at the input IN0 is lower than that of the input IN1 and decreases monotonically. Therefore, the output OUT follows the input IN0. During the period between time points $T_1$ and $T_2$, the input IN0 as well as the input IN1 take levels higher than the negative peak level of the input IN0 at time $T_1$, so that the output OUT is locked on the negative peak level at time $T_1$ due to the diodes D0 and D1. During these periods, the operational amplifiers OPA2 to OPA5 are applied with the negative waveform at the output OUT to their second input terminals 22, 32, 42 and 52 and a zero level to their first input terminals 12, 13, 14 and 15, so that the outputs of these amplifiers take positive levels at their respective output terminals. Since the respective diodes D2 to D5 are applied with reverse voltages as described above, they are blocked and the positive outputs of the operational amplifiers OPA2 to OPA5 have no effect upon the output level of the peak hold circuit PH that is held on the storage capacitor C.

However, during the period between time points $T_2$ and $T_3$, the level of the input IN1 falls to a value lower than the first negative peak of the input IN0 at time $T_1$, that is, lower than the output OUT which is applied to the second input terminals of all the operational amplifiers OPA0 to OPA5, so that the operational amplifier OPA1 delivers a negative output which turns the diode D1 conductive and consequently, the output OUT follows the input IN1 during this period. During the subsequent period between time points $T_3$ and $T_4$, the input IN0 as well as the input IN1 take levels higher than the negative peak value of the input IN1 at time $T_3$, so that the output OUT is locked on the negative peak level at time $T_3$ due to the diodes D0 and D1. During these periods $T_2$ to $T_4$ as well as the subsequent periods also, the differential input operational amplifiers OPA2 to OPA5 which have the output OUT applied to their second input terminals and a zero level applied to their first input terminals, have no effect upon the output level of the peak hold circuit PH, for the same reasons as described previously.

Thereafter, the same operations are repeated in the peak hold circuit PH. It will be obvious from the above explanation that during the period between time points $T_4$ and $T_5$ the output OUT follows the input IN0, that during the period between $T_5$ and $T_6$ the output OUT is locked on the second negative peak level of the input IN0 at time $T_5$, that during the period between $T_6$ and $T_7$ the output OUT follow the input IN1, and after time $T_7$ the output OUT is locked on the fourth (not third) negative peak value of the input IN0 at $T_7$.

While explanation has been made above with respect to the case where the MF signal is applied to the input terminals IN0 and IN1, similar operations will occur in the case where input signals are applied to other input terminals. Furthermore, though the above description has been made with respect to the detection of negative peak levels, it is possible to detect positive peak levels by connecting the diodes in reversed polarities. While the abovedescribed peak-holding circuit PH is constructed of operational amplifiers, it is possible to construct the same of diode OR circuits. However, it is to be noted that in the case of the diode OR circuit a forward voltage drop across a diode has fluctuations of the order of 0.2 to 1.0 volt, and that it does not pass a signal of a lower than about 0.2 volt. This implies that the diode OR circuit is not suitable for the case where the input signal level is low and a detector for detecting linearly at a high precision from zero volt is required.

Referring further to FIG. 4, the attenuator ATT is provided for converting the output of the peak-holding circuit PH in the preceding stage into a level that is appropriate to be applied to the threshold input of the detectors DET.

Referring again to FIG. 2, the variable threshold gate circuit VTG serves to provide a gate timer pulse from gate timer circuit GT. The gate timer circuit GT inhibits the outputs of the interface circuit INT during a predetermined period of time after the received signal has reached it. The inhibiting is for absorbing the transient response of the filters CHBPF's. In the case of the prior art multi-frequency signal receiver illustrated in FIG. 1, however, the out-of-band noise is removed by the main band-pass filter MBF and the gate timer circuit GT is started by the signal input. In the conventional receiver, therefore, if the frequencies of the signal and the out-of-band noise are close to each other, the number of the stages needed for the main band-pass filter MBF is high, making the filter complicated and costly to manufacture.

In the embodiment shown in FIG. 2, the input signals is passed through the amplifier AMP and applied to the inputs of the respective filters CHBPF, and also the same input signal is applied through a rectifier-integrater RI which achieves rectification as well as integration, to one input of a comparator COMP the other input of which is connected to the output of the peak hold circuit PH, the output of the comparator COMP being connected to the input of the gate timer circuit GT. Thereby the following operations are effected.

Upon application of a signal to the input, a signal having the most predominant frequency component is outputted from the corresponding filter CHBPF, and is applied through the peak hold circuit PH to one input of the comparator COMP. Then the signal which has reached the rectifier-integrater RI through the amplifier AMP, is rectified, integrated, appropriately weighted, and outputtted to be applied to the other input of the comparator COMP.

By designing the above-mentioned weighting circuit in such manner that the output of the peak hold circuit PH at this moment may become larger than the output of the rectifier-integrator RI, the gate timer circuit GT is started by the output of the comparator COMP.

Whereas, upon application of out-of-band noise to the input, the output from the filter CHBPF is attenuated by a stopping region attenuation ratio, so that the input signal applied from the peak hold circuit PH to the comparator COMP has a very low level. While, the level of the signal applied to the comparator COMP through the rectifier-integrator RI is high, because it is a level obtained by rectifying and integrating unattenuated noise. In this case, the comparator COMP is not actuated, and so, the gate timer circuit GT is not started.

As described above, the present invention makes it possible to eliminate the main band-pass filter and simplify the channel band-pass filters and the multi-frequency signal receiver according to the present invention is superior in performance than the prior art multi-frequency signal receiver. In addition, the present invention is especially effective for miniaturization, for making the receiver highly reliable, and for economization of the multi-frequency signal receivers.

What is claimed is:

1. A multi-frequency signal receiver adapted to receive an input signal consisting of at least two frequency tones selected out of more-than-two predetermined frequencies, comprising: filter means for receiving said input signal and having mutually independent pass bands at said frequencies; detector means coupled with said filter means for sensing the presence of a signal output at each of said frequencies; a variable threshold circuit coupled to said filter means for detecting the maximum value among the output signals of said filter means and for generating a threshold value for said detector means; an integrator circuit for integrating said input signal means for effecting weighted comparison between the outputs of said variable threshold circuit and said integrator circuit to provide a timing pulse; and means for gating outputs of said detector means by said timing pulse.

2. In a multi-frequency signal receiver of the type adapted to receive an input signal consisting of at least two frequency tones selected out of more-than-two predetermined frequencies, said receiver including filter means for receiving said input signal and having mutually independent pass bands at said frequencies and detector means coupled with said filter means for sensing the presence of a signal output at each of said frequencies, the improvement comprising:

a variable threshold circuit coupled to said filter means for detecting the maximum value among the output signals of said filter means and for generating a threshold value for said detector means;

a rectifier and integrator circuit for rectifying and integrating said input signal;

comparing means coupled to said variable threshold circuit and said integrator circuit for effecting weighted comparison between the outputs of said variable threshold circuit and said integrator circuit to provide a timing pulse; and gating means coupled to said detector means for gating outputs of said detector means by said timing means.

3. The multi-frequency signal receiver as recited in claim 2, further comprising an attenuator connected to the output of said variable threshold circuit.

4. The multi-frequency signal receiver as recited in claim 2, wherein said variable threshold circuit comprises:

a plurality of differential input operational amplifiers having respective first input terminals connected to corresponding outputs of said filter means and second input terminals connected in common, a plurality of diodes each connected between the output terminal and the second input terminal of a corresponding one of said differential input operational amplifiers, and a capacitor connected to the common connection of said second input terminals for storing a peak detected voltage.

5. The multi-frequency signal receiver as recited in claim 2, wherein said filter means comprises a plurality of multi-stage second order negative feedback type band-pass filters, one for each of said frequencies.

* * * * *